United States Patent

Filip et al.

[11] 4,119,583
[45] Oct. 10, 1978

[54] FOAMED ARTICLES AND METHODS FOR MAKING SAME

[75] Inventors: Stanislaw Franz Filip; Alexander Miutel, both of Toronto, Canada

[73] Assignee: KLF Inventions and Patent Development and Marketing Corporation Ltd., Rexdale, Canada

[21] Appl. No.: 764,416

[22] Filed: Jan. 31, 1977

Related U.S. Application Data

[63] Continuation-in-part of Ser. No. 631,439, Nov. 13, 1975, abandoned, and a continuation-in-part of Ser. No. 479,640, Jun. 17, 1974, abandoned.

[51] Int. Cl.$^2$ .......................... B29D 27/00; C08J 9/08
[52] U.S. Cl. ....................................... 521/103; 264/46.5; 264/46.6; 264/54; 264/DIG. 5; 264/DIG. 13; 264/DIG. 18; 428/322; 428/907; 428/921; 521/106; 521/123; 521/125; 521/138; 521/122; 521/908; 521/907
[58] Field of Search ............... 264/46.5, 46.6, DIG. 5, 264/DIG. 13, DIG. 18, 54; 260/2.5 N, 2.5 FP; 428/322, 907, 921

[56] References Cited

U.S. PATENT DOCUMENTS

| | | | |
|---|---|---|---|
| 2,461,942 | 2/1949 | Ten Broeck | 260/2.5 N X |
| 2,498,621 | 2/1950 | Kropa et al. | 260/2.5 N X |
| 2,576,073 | 11/1951 | Kropa et al. | 260/2.5 N X |
| 2,993,233 | 7/1961 | Hoppe et al. | 264/46.6 |
| 3,048,169 | 8/1962 | Pierce | 264/46.5 X |
| 3,124,626 | 3/1964 | Graham et al. | 264/45.4 |
| 3,227,665 | 1/1966 | Fourcade et al. | 260/2.5 N |
| 3,260,688 | 7/1966 | Watanabe et al. | 260/2.5 N |
| 3,479,303 | 11/1969 | Wieschollek et al. | 260/2.5 N |

Primary Examiner—Philip Anderson

[57] ABSTRACT

Foamed articles are made by causing the cross-linking of a thermosetting resin, preferably a polyester resin, concurrently with the production of carbon dioxide by the reaction of a carbonate with an inorganic acid. The carbonate is mixed with the resin and the acid then folded in in a progressively accelerated blending operation, whereupon carbon dioxide is generated to foam the resin, the carbonate, acid and setting time of the resin being selected to obtain an appropriate match between the progress of the foaming operation and the setting of the foam. The foam may be made in a mold coated with resin impregnated glass fibers, the impregnating resin becoming cross-linked with the foam. The impregnating resin may also be cross-linked with a resin gel coat, the glass fibers forming a tough layer between the gel coat and the foam.

6 Claims, 3 Drawing Figures

FOAMED ARTICLES AND METHODS FOR MAKING SAME

CROSS-REFERENCES TO RELATED APPLICATIONS

This application is a continuation-in-part of our application Ser. No. 479,640, filed June 17, 1974, and now abandoned and a continuation-in-part of our application Ser. No. 631,439, filed Nov. 13, 1975, and now abandoned.

BACKGROUND OF THE INVENTION

1. Field of the Invention

This invention relates to the production of foamed articles.

2. Description of the Prior Art

To form a synthetic resin foam, it is necessary to disperse a foaming agent through a resin to be foamed, and this dispersion must be achieved before the foaming process or setting of the resin is too far advanced if a satisfactory foam of uniform and predictable qualities is to be produced.

Foams have been made using organic compounds and heat to produce gases for forming cells in the resin, but such methods have been relatively expensive or inconvenient. Polyester foams have also been made by first producing an emulsion of water and polyester resin and then adding blowing agents in the form of bicarbonates. The formation of an emulsion is necessary in order to enable rapid dispersion of the blowing agent through the resin before either the blowing reaction or the setting of the resin is too far advanced. Foams produced by this method must have an open cell structure, so they can be dried to remove the unwanted water that remains after foaming. Water in the emulsion greatly lowers the peak temperature attained during the exothermic cross-linking reaction and greatly reduces foam strength and its impact resistance. Such foams have not achieved widespread commercial success, and the principal use of polyester resins in structural work has been in glass fiber laminates made of successive layers each of which must be allowed to cure to substantial rigidity before another layer is applied. To obtain substantial stiffness and bending resistance it is necessary to build up a large number of such layers.

U.S. Pat. No. 2,461,942 issued to Walter Ten Brocek discloses a process for making soft sponge from vinyl chloride copolymers. In the process vinyl chloride copolymer together with a plasticizer and a gas evolving solid is heated in a mold to a temperature at which the vinyl chloride copolymer mixture is quite fluid and at which the blowing agent is unstable. This process produces a soft sponge material and due to the liberation of gas from the blowing agent in a mold at a relatively high temperature is expensive and requires highly specialized molding techniques which can only be preformed at a factory site.

U.S. Pat. No. 2,498,621 issued to Edward Kropa includes a process for making porous foam material from polymerizable composition by using blowing agents in the form of diazolized toluidine salt and heating the mixture and curing it at 140° C., or adding a blowing agent in the form of ammonium bicarbonate and heating the mixture and curing it at 100° C., or adding a blowing agent in the form of powdered Dry Ice and heating the mixture and curing it at 140° C. to expand entrapped carbon dioxide or adding a blowing agent in the form of potassium carbonate and heating the mixture and curing it at 100° C. All of these methods of producing foamed porous material from polymerizable composition using blowing agents which are liberated by application of heat which in the production of foamed objects makes the manufacturing process more expensive and confined to the factory site.

U.S. Pat. No. 3,260,683 issued to Watanabe et al discloses a process making porous material from unsaturated polyester resin by using any blowing agent and anionic surfactants which consist of salts of organic ester of phosphoric acid or organic sulfonic acid salts. A catalyst and an accelerator are used for curing the foamed unsaturated polyester resin composition. The process is relatively expensive and results in a very light density foam suitable for heat insulation but brittle and not suitable for the manufacture of products requiring high strength. Also anionic surfactants which consist of salts of organic esters of phosphoric acid or organic sulfonic acid salts become ineffective when used with strong inorganic acids as components of blowing agent.

U.S. Pat. No. 3,479,303 issued to Helmut Wieschollek discloses a process for making porous foam material from unsaturated polyester resin using as blowing agents carbonates of the alkali metals and alkaline earth metals such as sodium carbonate, sodium bicarbonate, ammonium bicarbonate and calcium bicarbonate which react with organic acids like lower apiphatic acids, formic acid, acetic acid etc. to liberate carbon dioxide. Since such acids can only dissociate sufficiently in the presence of adequate water an emulsion of water and unsaturated polyester resin is prepared and a blowing agent, organic acid, hardener and accelerator added to obtain a porous structure which is of an open cell type and contains large amounts of water. In a product composed of such a foam, covered with a skin, like for example, polyester saturated fiber glass mat or cloth this water cannot be disposed of by drying and it produces a detrimental effect as far as the physical characteristics of the foam are concerned.

SUMMARY OF THE INVENTION

In accordance with the invention a resin foam, including a rigid polyester foam, can be made without the application of heat or the use of emulsions of resin and water. Cells are blown in the resin by a reaction which liberates carbon dioxide gas, the polyester being caused to harden, i.e. to gel and cure, when the cells have been blown, to prevent collapse of the foam.

The carbon dioxide is generated by the reaction of inorganic acids with carbonates. This reaction occurs rapidly but can be controlled by diluting the acids, and by using different acids which react at different speeds. For example, a rapid reaction occurs between hydrochloric acid and calcium carbonate, and a slower reaction occurs between orthophosphoric acid and calcium carbonate, and by using both acids the generation of carbon dioxide can be caused to continue over a period of a few minutes. The density of the foam can be controlled by varying the amount of carbon dioxide that is generated; thus, by increasing the amount of alkali carbonate and acid used it is possible to produce a lighter foam, as well as faster foaming. Expansion of the order of seven to ten times the original volume of the resin is easily obtainable, and expansion of up to thirty times has been achieved. We have found, surprisingly, that the necessary rapid initiation of the foaming process uniformly through the resin can be achieved if the carbonate is first dispersed in the resin and the acid is then folded into the resin with a progressively accelerating blending action.

Unsaturated resin containing a cross-linking monomer is mixed with a hardener (i.e. a catalyst or curing agent) and with the carbonate, a cross-linking accelerator (i.e. a promotor) is added to promote the polymerization of the polyester, and the inorganic acid is then folded in to cause initial production of gas at the resin-/acid interfaces, so lubricating and facilitating the blending operation which is progressively accelerated to provide surprisingly rapid dispersion of the acid through the resin before the reaction between the acid and the carbonate has progressed very far. Foaming then proceeds uniformly through the resin. By the term folded in is meant any method of introducing the acid into the resin mix such as to bodily introduce the acid into the resin and maximize the area of the interface between the two.

It is important to coordinate the foaming and gelling of the resin to ensure that foaming can occur to the desired extent and that gelling then prevents collapse of the foam. For example, if the foaming reaction lasts five minutes, gelling should occur by this time to provide a self-sustaining cellular structure which does not collapse. In a typical case, the foam can be hard enough to handle in fifteen minutes, and after twenty four hours it can be completely cured. The speed of hardening can be increased by increasing the amount of catalyst or accelerator included in the resin mix.

The foamed resin is preferably cured within an outer skin or skins of fiber reinforced resin to form an article having a reinforced skin and a foam interior, the resin content of the skin being preferably not fully cured so that cross-linking may take place between the resin contents of the foam and of the skin. As compared with known products having several layers of glass fiber reinforced unblown resin, the products of the present invention are capable of providing excellent stiffness with substantial savings in material and labour. Although tensile strength of the products of this invention is less than that of the multi layer laminated products, the latter usually have much greater tensile strength than is required.

BRIEF DESCRIPTION OF THE DRAWINGS

Preferred embodiments of the invention will be described with reference to the accompanying drawings in which.

DESCRIPTION OF THE PREFERRED EMBODIMENTS

Preparation of the Resin Mix

The invention is applicable to any non-water soluble cross-linkable resin which possesses or can be modified to possess sufficient surfactancy and viscosity to form and sustain a foam for a sufficient time for gelling of the resin to occur before collapse of the foam, having regard to the rate of production of the gas which produces the foaming.

In the present invention, foaming is achieved by the use of carbon dioxide gas generated in situ by reaction between a carbonate and an acid, the former being dispersed through the resin and the latter being subsequently blended into the resin in a manner described further below. The choice and concentration of the acid and of the carbonate will affect the rate of production of carbon dioxide and hence the rate of foaming as well as the nature of the foam; the reagents should be selected so that carbon dioxide producton is sustained long enough for the resulting foam to sustain itself until gelled.

Preferred carbonates are ammonium and alkali metal carbonates and bicarbonates and alkaline earth carbonates and mixtures thereof. Preferred acids include orthophosphoric acid and mixtures thereof with hydrochloric acid. The acid is diluted with water. The combination of carbonate and acid use in the process of the invention will be referred to for convenience as a blowing agent, of which the carbonate forms one component and the acid the other component. The carbonate component should be very finely divided to ensure satisfactory dispersion through the resin. Preferably the carbonate particles are no more than two or three microns in size.

The purpose of the acid component is to decompose the carbonate component but in most cases it is desirable that this decomposition should not be completed too rapidly since in this event the carbon dioxide may escape from the foam and the latter collapse before it is sufficiently gelled. At the same time, it is desirable that the foam should be substantially fully expanded before gelling commences. Ideally, the blowing agent should provide a fairly high initial rate of evolution of carbon dioxide, the rate of evolution then progressively reducing so as to make up losses of gas from the foam until it is sufficiently gelled to fix the foam structure and prevent further loss. For this reason it is preferred to use an acid component which exhibits a plurality of levels of acid activity. For example, orthophosphoric acid has three hydrogen ions, each of which can be neutralized in turn to produce an acid component of progressively decreasing activity as the acid reacts to produce first a dihydrogen phosphate, then a monohydrogen phosphate and finally a tribasic phosphate. As well or as an alternative to using a polybasic acid, a mixture of acids may be employed. Thus if a mixture of an aqueous solution of hydrochloric and orthophosphoric acids is used, the hydrochloric acid will show the greatest activity, and will provide a rapid initial reaction with the carbonate, the three hydrogen ions of the orthophosphoric acid then being neutralized in turn to provide a steadily decreasing activity. Whilst the use of mineral acids is preferred, both because of their generally lower cost and because of their lack of organic residues, those organic acids having reasonable high dissociation constants may also be employed provided that they have adequate water solubility. For the reason discussed above i.e. to obtain a progressive action, multibasic acids are preferred. The acid or acids used must be in aqueous solution: anhydrous or highly concentrated liquid acids are unpredictable in action since they can only dissociate sufficiently in the presence of adequate water, and solid acids, even when finely divided, have not been found to provide a satisfactory foaming action. Where orthophosphoric acid is used, a concentration of 30–40% is preferred. Exemplary blowing agents are discussed further below.

The resin mix to be foamed may be of any of a wide variety of thermosetting types. However, the invention has particular utility in relation to polyester resins, the foaming of which to provide highly expanded foams has hitherto presented considerable difficulties. The only essential property of the resin mix utilized is that it is water insoluble and has a combination of sufficient viscosity and surfactancy to be maintained in a foamed condition by the carbon dioxide generated therein by the foaming agent until cross-linking has proceeded far enough to gel the resin. Cross-linking is generally an exothermic process, and the heat generated thereby is a factor which influences the ability of the resin mix to sustain its foamed condition. Generally speaking, it is difficult to sustain a foam of good properties in terms of pore size and uniformity for more than a few minutes, and therefore the use of rapidly gelling resin mixes is preferred.

Exemplary resin mixes and the components thereof are discussed further below, including novel resin mixes particularly suited to the foaming method of the invention.

In order to prepare a foam, a resin mix is prepared in which the carbonate component of the foaming agent is finely dispersed, and the cross-linking of the resin mix is initiated in some suitable manner appropriate to the resin concerned and as discussed further below. The acid component of the foaming agent is then added to the resin mix and incorporated therewith. Since the acid component and the resin are immiscible, normal mixing is ineffective for this purpose. Surprisingly however, we have found that when the acid is initially enfolded in the resin mix and thereafter subjected to a progressively accelerating blending action, very rapid and uniform incorporation of the acid into the resin mix can be achieved. It is believed that the explanation for this phenomenon is as follows. On initial contact between the enfolded acid and the carbonate containing resin mix, the acid and carbonate react to form a layer of minute bubbles at the resin/acid interface. This layer of bubbles acts as a lubricant to facilitate the blending action, which in turn provides extended acid/resin interface surface lubricated in a similar manner, further facilitating blending and allowing the tempo of the blending action to be progressively increased, and thus still further accelerating the progress of the blending action. By this means, a resin/acid emulsion or prefoam can be obtained in only a few seconds, whilst effective incorporation of a conventional foaming agent into the resin mix by conventional means might have taken several minutes unless the resin was already emulsified.

Because of the speed with which the resin/acid emulsion may be obtained in the present process, the acid is uniformly incorporated into the mix before its reaction with the carbonate component has proceeded very far, and thus the resin mix is still no more than slightly expanded, in which condition the prefoam so produced may be poured or injected from a nozzle into a mold or site where foaming is to take place. The prefoam is still in a very dense form and with very small gas bubbles, but beginning to increase in volume. Depending on the surface tension of the foaming mixture and the type of any nucleation agents used, the very small bubbles combine into bigger ones, while the cross-linking of the polymerisable mixture proceeds and the viscosity of the foam rapidly increases. Due to the increase in viscosity and temperature of the mixture, the gas pressure in the bubbles in the solidifying foam is quite high and becomes locked in the foam structure, contributing to its strength. The size of the gas bubbles, the number of bubbles and therefore the foam density depends on the amount of blowing agent, the amount of catalyst and accelerator used, on the initial surface tension of the resin and on the peak temperature reached during the cross-linking reaction. All of these factors can be individually controlled. Typical molding techniques are described further below with reference to the drawings.

The initial enfolding of the acid component in the resin may be achieved by mechanically folding the two together, or by injecting the acid into the resin mix, or by any other means distributing the acid through the body of the resin with an extended interface between the two, the subsequent blending being such as to further break up the acid and extend the interfaces. Initially the blending action will be slow because of the viscosity of the resin, but progressive acceleration is possible as blending progresses and is necessary in order to achieve rapid emulsification of the acid in the resin.

Thus in the examples considered below, the acid was in each case initially folded into the resin by hand, followed by mixing at an accelerated rate by hand and/or by mechanical means. It will be understood however that the entire process could be carried out mechanically. Moreover, whilst the examples are directed to the production of individual batches of foam, those skilled in the art will understand that the method of the invention may be continuously applied to resin flowing sequentially through stages in which the various operations constituting the method of the invention are preformed upon it. The incorporation of the acid component is so rapid that once initial tests of gelling time have been made, it is often possible to delay addition of the acid component until well after the accelerator has been added to the resin mix to initiate cross-linking, and yet to complete mixing in of the acid well before gellation of the resin mix occurs.

RESIN

As already stated, the foaming method of the invention is applicable to any thermosetting cross-linkable water-immiscible liquid resin mix having a viscosity and surfactancy such as to enable a foam generated by reaction within the mix of the foaming agent components to be sustained for a time sufficient to allow gelling of the resin mix. Clearly the resin mix should be such that neither the acid nor the carbonate components of the foaming agent interfere substantially with the cross-linking process. However polyester resins are believed to have the widest field of utility in the application to which the invention is believed best suited, i.e. the production of structure having a skin or skins and a foam core chemically bonded thereto.

The resin mix should be compounded so as to have a gelling time which is sufficiently short of gelling to occur before collapse of the foam and this means that resins with a high cross-linking activity are usually required. In polyester resin mixes, the activity is controlled up to a certain point by the choice of and quantity of catalysts and accelerators utilized, but ultimately by the composition of the resin and the quantity of double bonds in the "backbone" of the polyester chain which are available as cross-linking sites. All this is well understood in the polyester resin art and will not be discussed in detail. Moreover, the constituents of the polyester chain will affect the properties of the foam obtained, as discussed below.

Resin mixes of the following characteristics are preferred.

Brookfield viscosity at 77° F.: 2000 to 3000 cps.
Acid value: 25 to 35
Styrene content: 25 to 30%

These may include mixtures of different polyester resins. A plasticizer may be added to the resin to impart some degree of elasticity.

With the same reactivity of the resin the use of either phthalic, isophthalic or adipic acids, or different glycols, in forming the polyester resin component of the resin mix affects the physical characteristics of the foam.

The use of a high proportion of phthalic acid units within the polyester resin produces a high strength brittle foam with low impact resistance.

The use of a high proportion of isophthalic units within the polyester resin, provides strength but increases elasticity.

The use of a high proportion of adipic acid units, within the polyester resin, produce a lower strength but highly elastic foam.

It will normally be found that in order to provide sufficiently rapid gelling of the resin to prevent collapse of the foam at least about 50% of the acid units in the polyester chains should include double bonds.

The use of non-crystallizing glycols (e.g. diethylene or dipropylene glycol) with propylene glycol in the polyester resin give a high strength foam with exceptional impact resistance, especially at low temperatures as low as −60° C.

The optimum foam characteristics for differing applications can usually be obtained by selecting mixing polyester resins of differing compositions. Thus in the specific Examples of this specification, the resin mixes used were produced by selecting or mixing in different proportions Resins A, B and C set out below. It should be noted that Resin A has medium high reactivity, Resin B has low reactivity, and Resin C has medium reactivity.

Resin A

A commercially available medium high reactivity general purpose thermosetting resin, sold by Canadian Pittsburgh Industries Ltd. under the designation Selectron (trade mark) RS 500-72, based on maleic anhydride and isophthalic acid in the molar ratio of 1.1 : 1 plus a mixture of propylene glycol and diethylene glycol in the molar ratio of 1 : 2.5-3 and having the following characteristics:

Brookfied viscosity at 77° F.: 2500 to 2600 cps
Acid value: 25 to 30
Styrene content (crosslinking monomer): 26%
Specific gravity: 1.17
SPL (Society of Plastic Industries) gel time: 4.5 to 6.0 min.
SPL peak temperature: 385° to 415° F.
Maximum water content: 0.15%

Resin B

A resin sold by Canadian Pittsburgh Industries Ltd. under the designation RS 500 98, and based on maleic anhydride and phthalic acid in the molar proportion of 1:3, and propylene glycol. The styrene content is 35 to 40% and the viscosity 2000-2020 cps.

Resin C

A resin sold by Canadian Pittsburgh Industries Ltd. under the designation "RSM-592" and based on maleic anhydride 1.5 moles, isophthalic acid 0.5 moles, phthalic acid 1 mole and propylene glycol.

Curing Agents

In order to initiate cross-linking of the resin mix, a system of curing agents is used. In the case of polyester resin mixes, this system of curing agents consists of a hardener or catalyst and an accelerator or promoter.

(1) Hardener: The preferred hardener is benzoyl peroxide, in the form of 50% benzoyl peroxide paste in tricresyl phosphate plasticizer. About 2½ to 5 parts by weight are added to 100 parts of resin.

(2) Accelerator: Dimethylaniline (DMA) is preferred, added in amounts of about 0.15 to 0.5 parts to 100 parts resin. Diethylaniline (DEA), which is milder, may also be used.

The gelling time of the resin, which for most applications should not usually exceed 4 to 8 minutes, depends on the quantity of curing agents used, the ratio of hardener to accelerator, and the ambient temperature.

Blowing Agents

As discussed above, these consist of two components, a carbonate component and an acid component. Two typical sets of blowing agent components are described below.

Blowing Agent A

The blowing agent consists of:

(1) A carbonate component, consisting of "Atomite" (trade mark) powder. It has a particle size of about 2.5 microns, and its composition is approximately 98.2% $CaCO_3$,
1.2% $MgCO_3$,
Balance neutral impurities, principally metal oxides $SiO_2$ and moisture.

(2) An acid component (Acid Component A) of the following formulation:

(a) 50 ml. of 85% orthophosphoric acid (specific gravity 1.69) was mixed thoroughly with 90 ml. $H_2O$.

(b) 20 ml. of 38% HCl (specific gravity 1.19) was mixed thoroughly with 90 ml. $H_2O$.

(c) 3 parts by volume of the $H_3PO_4$ solution were mixed with 1 part of the HCl solution. This acid has a specific gravity of about 1.2 g/cm$^3$.

The stochiometric ratio between the components of the blowing agent is 5 gm. "Atomite" to 8 ml. of "blowing acid". This quantity of blowing agent will generate approximately 1 liter of $CO_2$ and will produce with 40 gm. (33-35 cm$^3$) of one of the above resins, a medium density foam expanded 7 to 8 times (250-260 cm$^3$). Foam density is decreased as the amount of blowing agent is increased. Expansion of the resin by from 5 to 30 times can be achieved, the best results being in the 5 to 12 expansion range for products that are to withstand heavy loads. The compressive strength of polyester foam expanded 5 times is of the order of 300 psi depending on the resin used. For 100 parts of resin the use of about 10 to 30 parts by weight of calcium carbonate and about 12 to 32 parts by weight of "blowing acid" produce satisfactory foams, the calcium carbonate powder being normally added in excess to serve as a nucleation agent and filler. Cross-linking reaction of the polyester and the monomer constituents of the resin mix must be coordinated with the reaction of the components of the blowing agent to ensure that foaming can occur to the desired extent and that the gelling of the polyester prevents collapse of the foam.

The reaction between the components of the blowing agent occurs rapidly, but the rate can be extended by dilution of the "blowing acid" and can further be controlled by using inorganic acids having different disassociation constants.

Blowing Agent B

Blowing agent B also consists of two components.

(1) A carbonate component consisting of sodium bicarbonate, in the form of a fine powder, preferably of particle size of 1 micron.

(2) An acid component consisting of a 30–40% aqueous solution of orthophosphoric acid.

The above blowing agent is preferable in some applications to blowing agent A. Both blowing agents generate carbon dioxide through chemical reaction in the same way, but the same amount of generated carbon dioxide needs less weight parts of sodium bicarbonate per 100 weight parts of resin, due to difference in molecular weights, between sodium bicarbonate and calcium carbonate.

A much more important advantage of use of sodium bicarbonate lies in the fact that sodium bicarbonate requires only half the amount of blowing acid to release the same amount of carbon dioxide, because sodium bicarbonate already includes one cationic hydrogen atom. This of course also reduces by half the amount of unwanted water introduced to the system with the acid component.

Still another advantage resides in the fact that sodium bicarbonate, as a finely ground anhydrous powder, is more easily dispersed in the resin than calcium carbonate, which due to absorption of mositure tends to form larger particles.

Blowing agent B is also very useful in producing lower density foams, even without the use of surfactants and foam stabilizers. By choice of suitable surfactants and foam stabilizers, foam densities can be further decreased down to 0.02–0.03 grams per cm$^3$ (1–2 lbs/ft$^3$).

The amount of water present in the foam mixture depends on the quantity and type of blowing agent used in the generation of the $CO_2$. The lower the density of the foam, the higher the quantity of blowing agent required. Water is one of the byproducts of generation of $CO_2$ by reaction between acids and carbonates. The amount of water per weight unit of $CO_2$ is influenced by the nature of the carbonate component.

For example with calcium carbonate $CaCO_3 + 2H^+ \longrightarrow Ca^{++} + H_2O + CO_2$ 100 wp + 2 wp $\longrightarrow$ 40 wp + 18 wp + 44 wp (molecular weights)

On the other hand with sodium bicarabonate $NaHCO_3 + H^+ \longrightarrow Na^+ + H_2O + CO_2$ -continued 84 wp + 1 wp $\longrightarrow$ 23 wp 18 wp + 44 wp Also ammonium bicarbonate could be used in rare instances where the odour is not objectionable.

$NH_4HCO_3 + H^+ \longrightarrow H_2O + CO_2 + NH_4^+$ 79 wp + 1 wp $\longrightarrow$ 18 wp + 44 wp + 18 wp Water is not only produced by reaction of carbonates with acid, but also is introduced with aqueous solutions of blowing acids, which can be either a solution of hydrochloric and phosphoric acid or solution of phosphoric acid only. The presence of substantial quantities of water is undesirable since it not only degrades the physical characteristics of the foam (for example elasticity and strength) and also lowers the temperature reached during the cross-linking reaction, but also, by its very presence, creates an environment for potential growth of fungus. Moreover, if large amounts of water is present, it is necessary to provide an open cell foam structure to enable this water to be removed. For many applications, a closed cell foam structure is to be preferred. In the process which is the subject of this invention the amount of water introduced is reduced to a level, which in general enables the above disadvantages to be avoided.

It should be noted that in industrial applications it is better to use some excess of bicarbonate in relation to the stoichiometric quantity required to react with the acid, since any excess of hydrogen cations will then remain bound in the bicarbonate.

Other additives which may be incorporated in the resin mix include the following:

(1) A surfactant is useful, particularly in the production of low density foams (expansion of 10 to 30 times). For high and medium density foams a surfactant is also useful in reducing the size of the cells and achieving cell uniformity. Use of a surfactant reduces the amount of blowing agent that is required, since during the foaming action some $CO_2$ escapes from the foam: the surface tension of the resin may be modified by the addition of surfactants to minimize the escape of the gas and thus reduce the amount of blowing agent required and consequently the amount of water introduced. Also by the addition of surfactants the molds can remain open for a longer period, permitting escape of more water in the form of water vapor.

(2) A nucleation agent is helpful in obtaining uniform cells of a desired size. Foamed silica gel is a good nucleation and thixotropic agent, added in about 0.2 to 0.5 parts per 100 parts by weight of the resin. Talc may also be used. Barium metaborate (for example, that sold under the trade mark "Busan 11M-1") is an excellent nucleation agent and also acts as a fungicide when added in about 1 to 5 parts per 100 parts by weight of resin, thus counteracting the effect of residual water in encouraging fungus growth.

Talc is very useful in combination with the use of alkaline earth carbonates such as "Atomite", since by absorbing moisture, it maintains the carbonate in finely divided powdered form. When using talc by itself, as a nucleation agent, comparatively large uniform foam cells are obtained. When using barium metaborate by itself, as a nucleation agent, foams of the same density with very small uniform cells are obtained. It is one of the advantages of this invention that size of the foam cells can be regulated inter alia by using barium metaborate and talc in different admixtures as nucleation agents.

(3) Fire retardant properties may be desired, and a conventional mixture of antimony trioxide serves well for this purpose when added in about 2 to 15 parts per 100 parts by weight of resin. Barium metaborate is a good auxiliary fire retardant which may at least partially replace the antimony trioxide. The polyester resin itself may be selected to have fire retardant properties, by suitable choice as known in the art of its constituent monomers.

(4) A structural reinforcing agent can improve the strength and rigidity of the foam. As already indicated, glass fiber strands are preferred, chopped to lengths of typically about one quarter of an inch. The glass fibers are found to assist moreover in bubble formation and in preventing collapse of the foam. They may be added in about 0.25 to 1 part per 100 parts by weight of the resin.

Preparing the Resin Mix

A preferred order of mixing the components is as follows:

(a) The resin (containing monomer for cross-linking) is mixed with the selected hardener and any other liquid additives.

(b) Additives in powder form, including the carbonate component to the resin are added gradually with continuous mixing in order to obtain good particle distribution.

(c) The accelerator is added and rapidly blended with the mixture.

(d) After a short interval, depending on the formulation and the ambient temperature, the acid component is added and blended in quickly by the method discussed in more detail above. Foaming begins immediately, and when the desired expansion is achieved gelling should occur. The reaction is exothermic, a peak temperature of 160° to 220° F. often being reached after 1 to 2 minutes. This peak temperature can be controlled as already discussed above. After 10 to 15 minutes the foam is usually cool enough to be handled.

As it will be well understood by those skilled in the art, the various chemical components can be premixed in separate batches before a final mixing stage takes place.

For example a portion of a resin mix can be premixed with an accelerator and other additives used in appropriate proportions. The rest of the resin mix can be premixed with a catalyst and made into an emulsion with acid. Then both resin mixtures are thoroughly mixed and blended together. This method permits a good distribution of the suspended solids and uniform distribution of the accelerator, catalyst and the acid.

Some typical examples of polyester foams made in accordance with the invention are set forth below.

EXAMPLE 1:

Low Density (Large Celled) Foam 450 gm. of Resin A was mixed with 11 gm. of
50% benzoyl peroxide paste,
135 gm. "Atomite" powder, and
9 gm. zinc stearate, until a pasty mixture was obtained.

2 ml. dimethylaniline (DMA) was added and blended, and 90 ml. of an acid component comprising a mixture of 7.5% hydrochloric acid and 41.5% orthophosphoric acid in a 1.3 volume ratio was folded in and initially mixed using a manually operated spatula, the mixing process then being accelerated by use of a hand held mechanical propellor type mixer as the viscosity of the mixture dropped to form a prefoam which started to expand immediately, and was poured into a mold which was quickly closed. Within a few minutes the expansion within the mold was completed, and after about six minutes the foam started to gel. After fifteen minutes the foam was hard enough to handle.

EXAMPLE 2

450 gm. of Resin A was mixed with
22.5 gm. of the 50% benzoyl peroxide paste,
25 gm. "Atomite" powder, and
200 gm. talcum powder until a homogeneous mixture was obtained.
1.5 ml. of dimethylaniline and
3 ml. of diethylaniline were mixed in and
40 ml. of the same acid component as in Example 1 were added and blended in quickly by the same technique.

Foaming started immediately and was completed in the mold. The foam started to gel after a few minutes and could be handled in 10 minutes. A low to medium density, very strong foam was obtained.

In each of the following Examples 3-10, two batches of foam were produced. The first batch was mixed on a small scale, with one part, as recited in the examples, representing of the order of one gram. In those initial examples, the delay between the addition of the accelerator and the addition of the acid component recited in certain of the examples did not take place. Such delays were employed in most of the second batches, which each involves the use of about 2 kilograms of resin, in the light of the gelling times noted with the first batches. The mixing techniques employed in preparing the small first batches were as described in relation to Examples 1 and 2, although in a few of the earlier examples the batches were mixed throughout by hand, the tempo of mixing being increased in each case as emulsification of the acid in the resin mix proceeded. In the case of the larger batches, the resin mix was divided into two parts, the accelerator was blended into one part with an electric electric mixer, the catalyst was blended into the other part with an electric mixer, and the two parts then blended with a hand held electric mixer. The acid component was then folded into the mixture by hand until hand blending proceeded far enough for mixing to be continued at an accelerating rate using the hand held electric propellor mixer.

EXAMPLE 3

100 parts by weight of Resin A was mixed with
5.0 parts of the 50% benzoyl peroxide paste,
0.5 part zinc stearate,
15.1 parts "Atomite" powder,
0.25 part foamed silica gel.

At an ambient temperature of 74°-75° F., 0.3 part DMA accelerator was added. 24.0 parts of the same acid components as in Example 1 were added 1 minute after the addition of the accelerator and blended in. Gelling time was about 3 minutes. A medium density foam of 0.15 to 0.17 gm/cm$^3$ was obtained.

EXAMPLE 4

100 parts by weight of Resin A were mixed with
4.8 parts of 50% benzoyl peroxide paste,
0.5 part zinc stearate,
10.4 parts "Atomite" powder,
2.0 parts talc,
1.0 part "Busan (Trade Mark) 11M-1 (barium metaborate),
0.2 part foamed silica gel,
0.6 part chopped glass fibers, At an ambient temperature of 74° F. 0.3 parts DMA accelerator were added giving a gelling time of about 3 minutes, and 17 parts of acid component as in Example 1 were incorporated 1.5 minutes after the addition of the accelerator. A medium density (0.2 gm/cm$^3$) foam was obtained. The foam was glass fiber reinforced and very strong, with 16-17% of open cells.

EXAMPLE 5

100 parts by weight of Resin C were mixed with
5 parts of the 50% benzoyl peroxide paste,
0.4 part of the surfactant "Tween - 60",
8.0 parts "Atomite" powder,
2.5 parts talc,
0.2 part chopped glass fibers.

At room temperature, 0.3 part DMA accelerator was added and immediately thereafter 14.4 parts of acid component as in Example 1 were incorporated. The gelling time was 2 minutes, 50 seconds, and the time to the peak temperature of 208° F. was 4¾ minutes. Medium density foam, 0.13 gm/cm$^3$, corresponding to an expansion of 8 to 9 times, and glass fiber reinforced, was obtained.

EXAMPLE 6

100 parts by weight of Resin A were mixed with
5.0 parts of benzoyl peroxide,
12.5 parts sodium bicarbonate,
7.5 parts barium metaborate.

At an ambient temperature of 80° F. 0.3 part dimethylaniline (DMA) was blended in giving a gel time of 3 to 3.5 minutes. After 1 minute, 15.0 parts of 30% aqueous orthophosphoric acid (density 1.18 gm/cm$^3$) were incorporated and the prefoam poured into a mold as in previous examples. Smooth foam growth occurred over about the next 2-5 minutes, and a peak temperature of about 170° F. was attained after 4 to 4.5 minutes. The foam obtained was hard but somewhat elastic at ambient temperatures, becoming flexible at 60° C. Its density was 0.08 gm/cm$^3$, with quite uniform small cells, 90% of them closed.

EXAMPLE 7

75 parts by weight of Resin A and
25 parts by weight of Resin C were blended with
5.0 parts benzoyl peroxide
11.6 parts sodium bicarbonate
5.0 parts barium metaborate
2.5 parts finely powdered talc, and
0.65 part "Sylloid" (Trade Mark) — 244 synthetic silica Then 0.24 part DMA were blended in, and after 1 minute, 13.8 parts 30% aqueous orthophosphoric acid (including 9.6 wp of water) were incorporated.

A hard, rigid, uniform foam was obtained with medium size cells and no sign of thermoplasticity, the foam density being 0.085 gm/cm$^3$. At an ambient temperature of 78° F. the gel time was 4.0 minutes, and foam growth occured over 3.5 minutes. The time to peak temperature was 5.5 minutes.

EXAMPLE 8

20 parts by weight of Resin C,
80 parts by weight of Resin A were blended with
5.0 parts benzoyl peroxide
15.8 parts sodium bicarbonate
5.0 parts barium metaborate
2.5 parts talc
1.0 part "Sylloid" -244 synthetic silica.

Then 0.33 part DMA was added, followed after 1 minute by the blending in of 15.6 parts of 40% aqueous orthophosphoric acid (including 9.3 weight parts of water).

A strong rigid foam was obtained with very regular and uniform medium size cells (diameter from 1.5 to 3 mm.). Foam density 0.07 gm/cm$^3$ (4.4 lbs/ft$^3$). At an ambient temperature of 78° F. the gelling time was about 3 minutes. Foam growth occured very smoothly over 2.5 minutes.

It was discovered that orthophosphoric acid during liberation of the carbon dioxide creates phosphoric salts which act as a surfactant helping to sustain the foam over longer periods before it collapses.

EXAMPLE 9

70 parts by weight of Resin A, and
30 parts by weight of Resin C were blended with
4.0 parts benzoyl peroxide
0.5 part "Tween" (polyethylene sorbitan monostearate)
9.0 parts sodium bicarbonate
3.0 parts barium metaborate
0.4 part fumed silica gel as sold under the trad mark "Cab-O-sil"

Then 0.25 part DMA were blended in followed after 1 minute by the incorporation of 10.5 parts of 30% aqueous orthophosphoric acid (including approximately 7.6% weight parts of water).

A strong, hard foam was obtained with very regular small-medium size ($\phi$ 1-1.5 mm) cells, and a density of 0.11 gm/cm$^3$. At an ambient temperature of 80°-82° F. the gelling time was 4.5 minutes, with foam growth occuring over 4 minutes. The time to peak temperature was 6 minutes.

EXAMPLE 10

100 parts by weight of Resin A were blended with
5.0 parts benzoyl peroxide
11.5 parts "Atomite" powder
12 parts antimony trioxide
4.5 parts barium metaborate
0.25 part fumed silica gel 0.33 part DMA accelerator was blended into the mixture, and after ½ minute 22.7 parts of the acid component of Example 1 were incorporated.

At ambient temperature (71° F.), the gelling time was approximately 4.5 minutes. Time to peak temperature of 188° F. was 6 minutes. A medium density foam was obtained with quite uniform cell size of from 1.5 to 3.5 mm. The foam density was 0.21 gm/cm$^3$, and the self-estinguishing time of the foam about 2 seconds.

In the foregoing Examples 3-10, foams were obtained having densities ranging from 0.07-0.24 grams per cubic centimeter. The foams exhibited compressive strengths ranging from 45-124 lbs/sq.in., proportional in the main to the foam density though varying also according to the presence of reinforcing components such as glass fiber chops and according to the flexibility of the foam.

The foams of the foregoing examples may most advantageously be utilized to produce foamed products in which the "mold" in which the foam is cured is at least partially defined by a skin of fiber reinforced polyester resin. This technique is described further with reference to the drawings.

Figure 1:
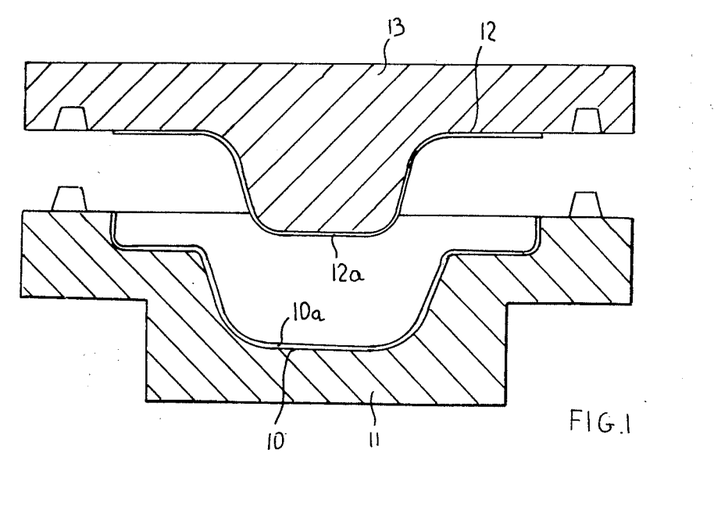
FIG. 1 is a diagrammatic sectional view through male and female parts of a mold, the parts being separated and having their mold surfaces coated with glass fiber reinforced polyester skins.
Figure 2:
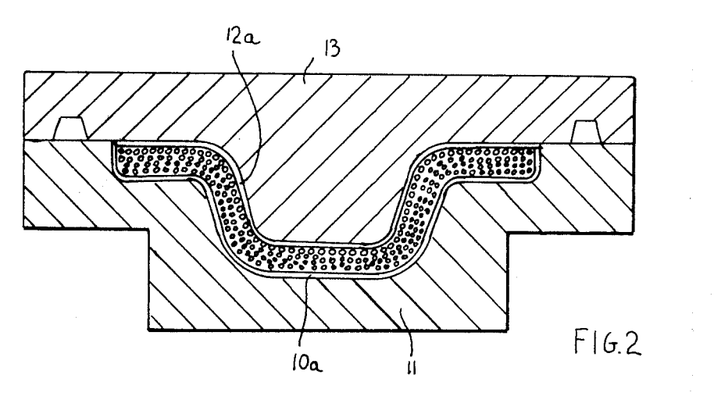
FIG. 2 is a similar view of the parts of the mold brought together and with a core of polyester foam formed between them.

Referring to FIG. 1, the surface 10 of a female mold part 11 is first covered with a gel coat of polyester resin that is sprayed or painted onto the surface 10. Then there is applied to the gel coat one or more layers of polyester resin reinforced with glass or other reinforcing fibers or fabrics. The gel coat and the reinforced resin layer or skin are formed in the same way as for conventional glass fiber reinforced structures (e.g. in making boats), the reinforced resin crosslinking with the gel coat to form a gelled but not fully cured layer designated by reference numeral 10a. The surface 12 of a male mold part 13 is similarly provided with such a layer 12a, constituted by a polyester coat backed by a fiber reinforce polyester skin. A polyester prefoam is prepared as discussed above and quickly poured into the female mold part after incorporation of the acid component initiates foaming, which may be allowed to continue until the molds are full and gelling begins. The male mold is then clamped against the female as shown in FIG. 2, and the foaming and gelling of the foam continue between the mold parts to form a foamed core 14 which cross-links with the glass fiber reinforced gel skins previously applied to the surfaces 10 and 12. Only a low pressure (atmospheric to ½ p.s.i.g.) need be required to keep the mold closed (the weight of the male part is usually sufficient) if a suitable quantity of foaming agent has been used and there is not need to apply heat. The curing time in the mold is influenced by the formulation of the foam ingredients and the ambient temperature, but is substantially independent of the size of the molded product. The maximum size of the product is thus limited only by the practical size of the mold. The product can be removed from the mold as soon as it can be handled without deforming, even through it has not reached its ultimate physical strength.

The glass fiber reinforced skin may be made by applying a mat of glass fibers onto the gel coat and saturating the mat with polyester resin, or by laying down one or more glass fiber cloths which are saturated with polyester resin. The cloths provide greater tensile strength. The skin is usually formed by a hand layup process, using a polyester resin with catalyst and accelerator (e.g. methyl ethyl ketone peroxide, and cobalt naphthenate, respectively) that provide a relatively long curing time, whereas faster hardening is required for the polyester that is to be foamed, in order to synchronize the blowing of bubbles with the gelling of the foam. The rapid curing of the foamed polyester is accompanied by the release of considerable heat within the mold, and this accelerates the curing of the polyester of the skin.

In conventional hand layup fiberglass construction a polyester resin with relatively slow curing time is used. The choice of resin is dictated by the production aspects of the process, in which layers of fiberglass mat are saturated, usually by hand, with polyester resin, which is brushed and/or rolled on. Curing time of the polyester resin, containing a peroxide catalyst, depends on the relative quantities of the hardener or accelerator used and on the initial ambient temperature. The accelerator activates the actalyst, which can also be activated by temperature. For example, with high enough ambient temperature, for example 50° C. or over, the use of an accelerator may not be necessary, since increased temperature, reduces the time required for cross-linking. Since the hand layup technique requires a slow curing gel coat and resin, the application of the prefoam, which is undergoing a highly exothermic cross-linking reaction and thus rises to a high temperature, accelerates the curing time of the resin of the skin. The temperature attained by the foam affects the time of curing, the strength of the skin and also the degree of cross-linking between polyester resin of the foam and the polyester resin of the skin, which affects the strength of the molecular bond so produced. Preferably the same monomer is used in resin mix used for the foam and in the resin mix with which the skin is saturated. An optimum curing temperature may be obtained by suitable formulation of the resin mix used to produce the foam and can be closely controlled. The peak temperature of the foam is controlled by the amount of catalyst and accelerator used in the manner discussed and is also influenced by the amount of blowing agent and by other additives which may be employed such as surfactants which affect the surface tension of the resin from which the foam is made. There are other well known retardants (such as some plasticizers), which can be used to slow the cross-linking action and therefore control the peak temperature attained by the foam. An additional factor which affects the peak temperature is the amount of water released by the blowing agent during its reaction to produce $CO_2$. Such water not only tends to lower the peak temperature attained but is detrimental both to the physical characteristics and commercial value of the foam and therefore must be limited to an absolute minimum. In the process, which is the subject of this invention, it is possible to limit the amount of water generated or present during the foaming process to a low level. When the prefoam is poured into molds and before the molds need be closed, the foam can reach close to its peak temperature, enabling most of the water to be evaporated and escape with excess $CO_2$. It should be noted that excessively high exothermically generated peak temperatures produce a higher shrinkage coefficient and should therefore be avoided when molding precise shapes.

The peak temperature attained depends to a very high degree, on the type of resin used. For example highly reactive polyester resins have a higher content of double bonds available for cross-linking and therefore release a higher amount of energy. Their strength and hardness is also increased and their elasticity reduced as compared with less reactive resins. Such highly reactive resins provide more cross-linkages between the foam and the skin, providing a high strength molecular bond, which may however tend to be brittle. To reduce brittleness and improve impact characteristics, the resin reactivity usually needs to be reduced.

Care is taken to ensure that the gel coat and the fiber reinforced polyester of the skin cure concurrently, and the foaming step is carried out before the polyester of the skin has hardened to ensure concurrent curing of the foamed polyester and of the skin polyester. Cross-linking therefore occurs between the skin polyester and the gel coat and between the skin polyester, and the foam polyester, and this is facilitated by use of the same monomer, preferably styrene, in each of the polyester resins. It can be further facilitated by using the same resin for the gel coat and for the skin, and by mixing at least some of the same resin with one used for foaming. There is therefore achieved a strong molecular bond between adjacent layers of the of the resultant product, and the heat generated makes possible a short production time. For small, light products the time required in the mold may be as little as 5 to 7 minutes, but for larger objects (e.g. an 18 foot boat) the time, depending on the foam formulation, may vary from 25 minutes to an hour. The resultant sandwich-like product is of light weight, the thin polyester gel coat providing smooth, glossy external surfaces of hard, durable, tough resin with excellent dent, scuff and weather resistance and chemical inertness. With a suitable choice of foam formulation, most of the cells of the foamed core are discrete cells, and if the resultant product is used as a boat, for example, a hole can be punched through it but the boat remains buoyant and will not sink. In a typical case, the foamed core material will, if immersed about one inch below the surface of water, absorb some water during the first half hour, but thereafter its water absorption (checked by weighing it) does not change.

The foamed core material is somewhat flexible and resilient. Its strength and rigidity can be greatly increased as exemplified above by including in the mix reinforcing glass fiber strands, preferably of the order of one quarter of an inch in length.

Figure 3:
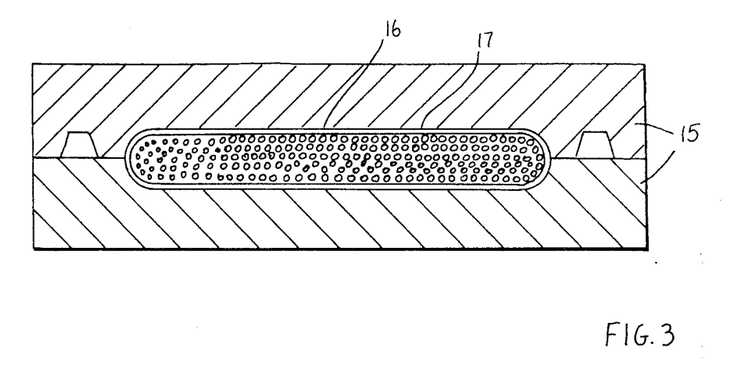
FIG. 3 is a similar view of a mold for forming a product of different shape.

The mold of FIG. 3 consists of two female part 15 between which is formed a sandwich-like product having a thin polyester gel coat backed by and cross-linked to a glass fiber reinforced polyester skin 16 and a rigid foamed polyester core 17 cross-linked to the skin 16. The product has a high strength to weight ratio, good heat insulating and sound deadening properties and fatique resistance. Since the gel coat, the fiber reinforced skin and the core are made from the same resin, with the same thermal coefficient of expansion, the product is not adversely affected by temperature changes. It does not warp and is not dimensionally affected by moisture. It can be as dimensionally accurate as the mold provided that the peak temperature attained by the foam during curing is properly selected. The product can absorb impacts by localized deflection at the point of impact. The fiber reinforced skin can be relatively thin as compared to conventionally built-up laminates, and its thickness can be varied locally to match expected stresses. The thickness of the foam can also be varied in the same product from between, for example $\frac{1}{4}$ inch to over 6 inches.

While the finished products will usually be formed with a skin at both sides of the foamed core, as described with reference to FIGS. 1 to 3, a side of the sandwich-like product may be formed simply by laying a mat of glass fibers over one of the mold surfaces, dispensing with the polyester resin gel coat if a smooth, finished surface is not required. Alternatively, before foaming the core there may simply be laid, over one of the mold surfaces, a sheet of cloth or other suitable material that can be stripped away from the foamed polyester resin before it has completely cured, so that there is no skin overlying one side of the foamed resin. This provides a porous, sound-absorptive surface.

The density of the foam can be selected to suit the product requirements. A range of densities of about 0.06 to 0.3 gm/cm$^3$ includes at one end foams primarily for insulation and of the other end foams having relatively high strength, and at least such range can be achieved with the present invention. It is possible to obtain cross-linking of successive foam layers of different densities and compressive strengths. Local reinforcements or objects of wood, metal or plastic can be placed in the mold, or can be affixed to the glass fiber reinforced skin, before the foaming step so as to cast them into the final product where they can serve, for example, as mounts for hinges or fasteners, but without such inserts a medium density foam covered with a glass fiber reinforced skin will hold wood screws and pop rivets. Before foaming it is also possible to insert low density or hollow inserts; the latter may have a glass fiber reinforced polyester skin so as to provide a high strength surface about an enclosed space.

The products made as described above may be used for a great variety of purposes, for example, as structural panels in building construction, as vessels, and (particularly in the case of a product having no skin over one surface) as a sound deadening hood for an automotive or snowmobile engine. The products may themselves be formed as light, inexpensive molds for other products.

It will of course be understood that the foam may be cast in molds without any skin layer, or with skin layers without reinforcement or within a precured skin, although in this latter case there will be little or no cross-linking between the skin and the foam.

Examples of the production of skinned foam articles in accordance with the invention are given below.

EXAMPLE 11

A sandwich-like laminate, 12 inches square, was prepared consisting of two glass fiber reinforced polyester skins separated by a one inch thick polyester foam core of 1 inch height. A 12 inch square frame was placed in a flat bed press, and a first skin consisting of two layers of glass fiber mat saturated with polyester resin was placed at the bottom of the frame, the polyester saturating the upper layer of the skin not being fully cured. 200 gm. of resin prefoam, prepared as described below was poured freely into the frame over the skin and this was covered by a further skin similar to the first skin but inverted. The press was then closed sufficiently so that expansion of the foam under its own pressure could occur to a depth of one inch, excess pressure being relieved by eight quarter inch diameter holes spaced around the periphery of the frame, which let out some excess of the expanding foam. The foam cured between the skins reaching its peak temperature within 5 minutes (at ambient temperature of 79° F.), accelerating complete curing of internal layers of the top and bottom skins and forming molecular bonds with them. 10 minutes after the pouring of the premix, the sandwich-like laminate was removed and on the next day was cut into serveral pieces 2 inches × 2 inches for density and compressive strength determinations.

The prefoam was formed from a resin mix comprising:

100 parts by weight of Resin A 5 parts of the 50% benzoyl peroxide paste 0.8 part of surfactant (polyoxyethylene sorbitan monostearate (Tween-60))

9.2 parts "Atomite" powder 5.0 parts talc 0.5 parts foamed silica gel (CAB-O-SIL)

0.25 parts chopped glass fibers (i.4 inches long)

At an ambient temperature of 79° F. 0.25 part DMA accelerator was added and one minute after 17.5 parts of acid component as in Example 1 were blended in as in that example. The gelling time was about 3 minutes 40 seconds and a peak temperature of about 200° F. was reached after 5¼ minutes. This prefoam produced a foam density of 0.11 g/cm³ under conditions of free expansion. In the sandwich-like product of this example, expanding under its own pressure, the density of the foam component was 0.13 g/cm³. The foam between the skins was uniform with regular small or very small cells. A sample 2 inches × 2 inches of the laminated product showed a compressive strength between 73-74.5 lbs/sq.in.

Attempts to remove the glass fiber reinforced skins resulted in fracture of the core rather than breakage of the bond between the core and the skins.

EXAMPLE 12

A laminate was made as in Example 11 but with foam of 2 inch thickness and using a prefoam prepared from a resin mix of the following formulation:

100 parts by weight of Resin A, mixed with
4.0 parts of 50% benzoyl peroxide paste
10.0 parts sodium bicarbonate
4.2 parts barium metaborate
1.0 part talc
1.0 part "Sylloid-244" (synthetic silica)

0.18 part DMA (dimethylaniline) was mixed in, followed after 1 minute by 11.8 parts 30% aqueous orthophosphoric acid, according to the technique of the preceeding Example. Foam growth took approximately 3.5 minutes, and gelling time was 5.0 minutes (at ambient temperature of 82° F.) from the addition of the accelerator. The time to peak temperature was 7.0 minutes. A regular, strong foam was obtained with small very uniform cells. The density of the foam in the sandwich was 0.11 g/cm³. The same prefoam allowed to expand freely produced a foam having a density of 0.09-0.11 g/cm³. Samples 2 inches × 2 inches of the laminate showed a compressive strength of 68-69 lbs/sq. in.

What we claim is:

1. Process for production of foam body of an unsaturated fast curing general purpose polyester resin in viscosity range from 1800 to 3000 CPS, a copolymerizable monomer vinyl compound, a finely divided bicarbonate, finely divided nucleation agent, quantity of tertiary amine hardening accelerator and peroxide catalyst to initiate cross-linking of the resin in two and a half to 6 minutes, mixing of the components and incorporating into the resin mix a 30 percent to 40 percent aqueous inorganic orthophosphoric acid which exhibits progressively decreasing level of activity as it reacts with the bicarbonate component in liberation of carbon dioxide, the orthophosphoric acid creating phosphoric salts which act as a surfactant to help to sustain foam before it is gelled, mixing of the components at an accelerated tempo until the acid is blended throughout the resin mix and will liberate carbon dioxide before cross-linking reaction has proceeded far enough to gel the resin mix.

2. A process as claimed in claim 1 wherein the nucleation agent comprises barium metaborate.

3. A process as claimed in claim 1 wherein the resin mix includes zinc stearate.

4. A process as claimed in claim 1 wherein the resin mix includes glass fibers.

5. A process as claimed in claim 1 wherein the resin mix includes a fungicide.

6. A process as claimed in claim 1 wherein the resin mix includes a fire retardant.

* * * * *